United States Patent [19]

Eftechiou

[11] Patent Number: 5,231,658
[45] Date of Patent: Jul. 27, 1993

[54] TELEPHONE PRIVACY DEVICE

[76] Inventor: Vakis Eftechiou, 3525 Marmac St., Mississauga, Ontario, Canada, L5L 5A2

[21] Appl. No.: 841,118

[22] Filed: Feb. 25, 1992

[51] Int. Cl.$^5$ .............................................. H04M 1/72
[52] U.S. Cl. .................................. 379/194; 379/199; 379/442; 379/195
[58] Field of Search ............... 379/184, 168, 194, 195, 379/199, 442

[56] References Cited
U.S. PATENT DOCUMENTS 4,805,210 2/1989 Griffith ................................ 379/195
4,941,166 7/1990 Waldman et al. ................... 379/184

Primary Examiner—Stafford Schreyer
Attorney, Agent, or Firm—Moss, Barrigar & Oyen

[57] ABSTRACT

A telephone privacy protector for connection to a common exchange line and each one of at least two telephone operated devices sharing a line includes a voice connecting circuit for connection between a respective telephone line operated device and the line. There is a control deice connected to the circuit having an on and off state wherein the control device in the on state permits the voice connecting circuit to operate. There are means for turing the control device on when the respective telephone line operated device goes off hook provided that no other telephone line operated device sharing the line is off hook. There are means for providing a residual charge to the control device in order to reactivate same after the respective telephone line operated device is placed momentarily on hook and then returned to an off hook state while any other telephone line operated device connected to the line is off hook.

16 Claims, 2 Drawing Sheets

TELEPHONE PRIVACY DEVICE

BACKGROUND OF THE INVENTION

This invention relates to telephone systems and particularly to a device for providing privacy for a particular telephone line operated device which is off hook such that other telephone operated devices sharing a line cannot interrupt.

In many commercial and residential telephone installations there are a number of telephone line operated devices sharing a common exchange line. In such installations, particularly where the telephone line operated device is a modem or fax machine, it is important that hen these devices are in use other devices on the same line cannot interrupt unless so authorized by the user of the telephone line operated device that is actively connected to the line.

There are many arrangements known in the art of telephone systems for providing privacy on a telephone line operated device which shares the common exchange line with other devices when such are in use.

There are a number of known problems with these privacy devices. A major problem with some of these privacy devices is that each telephone line operated device need to be physically connected so that the privacy device can sense when one is in use. For example, D. J. Ryan U.S. Pat. No. 4,825,465 issued Apr. 25, 1989 shows such a device. This is not practical in an office or residence where there are individual jacks in separate rooms.

Another problem with some of these privacy devices is that the mechanism for allowing a telephone line operated device to interrupt a line already in use is controlled by the telephone line operating device that is interrupting the existing connection. K. L. Chan et al. U.S. Pat. No. 4,747,128 issued May 24, 1988 shows a telephone privacy protector having a voice connecting circuit, a control circuit a trigger and an override switch. This switch operates such that anyone wanting to interrupt a line that is already in use can press the override switch and do so. However, it is the telephone line operated device that is off hook and therefore in use that should control the interruption of another telephone line operated device since an interruption in a modem or a fax transmission can significantly affect the information sent or received.

It is an object of the present invention to provide a telephone privacy protector that allows the operator of the telephone line operated device that is off hook to authorize other telephone line operated devices to connect to the same line. It is a further object of the invention to provide a telephone privacy jack that is easily installed whereby the privacy jack is inserted into the common exchange line jack and the telephone line operated device is then inserted into the privacy jack.

SUMMARY OF THE INVENTION

According to one aspect of the invention a telephone privacy protector for connection to a common exchange line and each one of at least two telephone line operated devices sharing the line includes a voice connecting circuit for connection between a respective telephone line operated device and the line. There is a silicon controlled rectifier connected to the circuit having an on and off state. There is a means for turning the rectifier on when the respective telephone line operated device goes off hook provided no other telephone line operated device connected to the line is off hook and thereby permitting the voice connecting circuit to operate. There are means to provide a residual charge to the rectifier in order to reactivate same after the respective telephone line operated device is placed momentarily on hook and then returned to an off hook state while any other telephone line operated device connected to the line is off hook.

According to another aspect of the invention, a telephone privacy protector for connection to a common exchange line and each one of at least two telephone operated devices sharing a line includes a voice connecting circuit for connection between a respective telephone line operated device and the line. There is a control device connected to the circuit having an o and off state wherein the control device in the on state permits the voice connecting circuit to operate. There are means for turning the control device on when the respective telephone line operated device goes off hook provided that no other telephone line operated devices sharing the line is off hook. There are means for providing a residual charge to the control device in order to reactivate same after the respective telephone line operated device is placed momentarily on hook and then returned to an off hook state while any other telephone line operated device connected to the line is off hook.

According to another aspect of the invention, a privacy protecting jack for connection to a common exchange and each one of at least two telephone line operated devices sharing the line includes a jack body having one end adapted for insertion in a connecting jack operatively connected to the exchange line and having a jack receiving socket. There is a voice connecting circuit for connection between a respective telephone line operated device and the line. There is a control device connected to the circuit having an on and off state and the control device in the on state permits the voice connecting circuit to operate. There is means for turning the control device on when the respective telephone line operated device goes off hook provided that no other telephone line operated device sharing the line is off hook. There are means for providing a residual charge to the control device in order to reactivate same after the one telephone line operated device is placed momentarily on hook and then returned to an off hook state while any other telephone line operated device connected to the line is off hook. The connecting circuit, control device, turning on means, and residual charge providing mechanism are mounted in the jack body.

Further features and advantages will become apparent from the following detailed description of a preferred embodiment taken in conjunction with the accompanying drawings.

DETAILED DESCRIPTION OF THE PREFERRED EMBODIMENT

Figure 1:
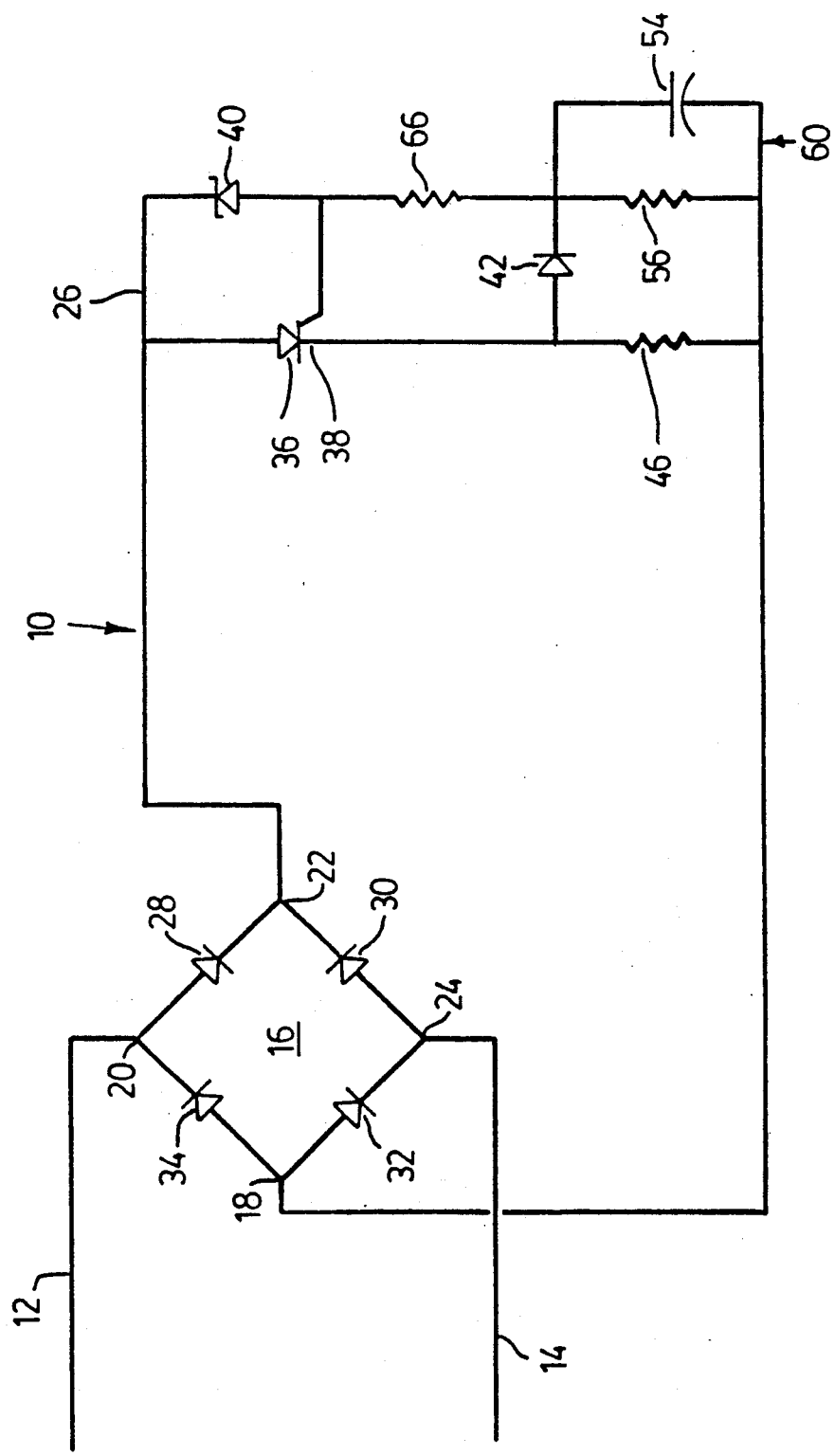
FIG. 1 is a circuit diagram of the telephone privacy protector in accordance with the invention.

FIG. 1 shows the circuit diagram for the telephone privacy protector 10 connected to a common exchange line (not shown) and a telephone line operated device (not shown). The telephone line operated device may be a telephone, a modem, a facsimile machine, an answering machine or any device that can be attached to a common exchange line. The common exchange line is one consisting of a tip and ring conductor and is connected to line 12. A telephone line operated device is connected to line 14.

Rectifier bridge 16 is a basic line connecting circuit used for connecting or disconnecting the connection between the common exchange line and the telephone line operated device attached to lines 12 and 14 respectively. There are four rectifier junctions 18, 20, 22 and 24 and four rectifiers 28, 30, 32 and 34 in rectifier bridge 16. Junction 20 is connected to line 12 which in turn is connected to the common exchange line and junction 24 is connected to line 14 which in turn is connected to a telephone line operated device. A control device generally shown at 26 is connected between junctions 18 and 22.

If the control device is in the on state, a current will flow from line 12 through junction 20, forward biased rectifier 28, junction 22, control device 26, junction 18, forward biased rectifier 32, junction 24 and to line 14. If the direction of flow of the current is reversed, the current Will flow from line 14 through junction 24, forward biased rectifier 30, control device 26, junction 18, forward biased rectifier 34, junction 20 and to line 12.

The control circuit includes a silicon controlled rectifier 36 having a gate 38, a zener diode 40 and diode 42. Zener diode 40 is electrically connected to gate 38 and provides means to turn on and off the silicon controlled rectifier 36. Zener diode 40 has a threshold voltage responsive to the line voltage wherein if the line voltage is higher than the threshold voltage, the zener diode would trigger the gate to turn the silicon controlled rectifier into the on state. The line voltage Will be higher than the threshold voltage when no other telephone line operated device sharing the line is off hook. If the line voltage is lower than the threshold voltage, the silicon controlled rectifier will remain in the off state and no voice connection will be established.

A resistor 46 and a timing circuit 60 are both connected to control device 26 to provide a residual charge to control device 26 in order to reactivate same after its telephone line operated device is placed momentarily on hook and then returned to an off hook state. If any other telephone line operated device connected to the same line is off hook, at that moment it will interrupt and thus the resistor 46 and the timing circuit 60 allows the operator of the original off hook telephone operated device to allow other telephone line operated devices to interrupt on the same line.

The illustrated embodiment of this invention can accommodate pulse dialing which form of dialing includes brief interruptions in the line during dialing. With this embodiment such dial pulses will not disturb the operation of the privacy protector 10'.

In order to ensure that during the dialing of a pulse type telephone line operated device a second telephone line operated device cannot interrupt, the timing circuit 60 including a capacitor 54 and a resistor 56 are provided. Resistor 56 controls the discharge timing of capacitor 54 and further maintains the charge of capacitor 54 at a predetermined level. The timing circuit 60 makes the privacy device quite reliable during the flashing of either a pulse or dial type telephone line operated device and it protects the privacy of a pulse activated telephone line operated device during the dialing procedure.

Figure 2:
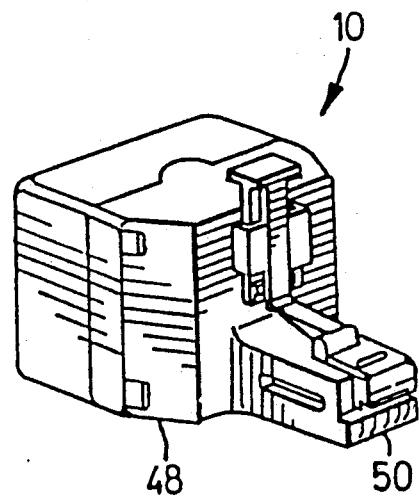
FIG. 2 is a perspective view of the telephone privacy jack constructed in accordance with the invention showing the back view.
Figure 3:
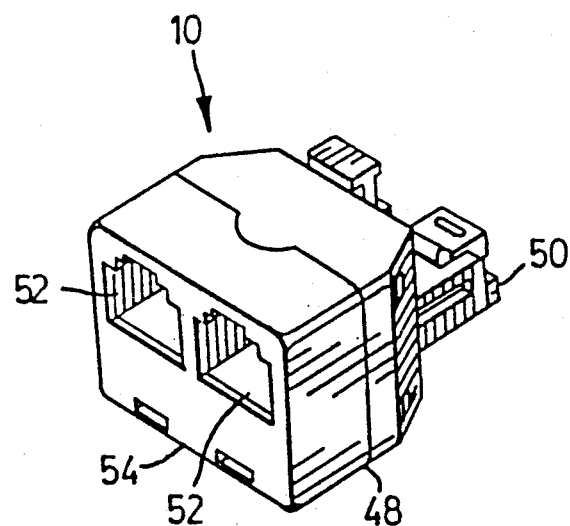
FIG. 3 is a perspective view of the telephone privacy jack constructed in accordance with the invention showing the front view.

The telephone privacy protector can be an integral part of the telephone line operated device or it can be mounted in a jack body as shown in FIGS. 2 and 3. Jack body 48 has one end 50 adapted to be inserted into a standard wall jack as found in most office and residential installations. Jack body 48 has at least one receiving socket 52 at another end 54 adapted to receive a conventional plug which is attached to a telephone line operated device. The jack body 48 can have a plurality of receiving sockets 52 so that a plurality of telephone line operated devices can be plugged into the same jack. FIG. 3 shows a jack body 48 having two receiving sockets 52. In another embodiment (not shown) jack body 48 can have only one receiving socket 52.

In the preferred embodiment of the invention as shown in FIG. 1, a 4000 series diode is utilized for rectifiers 28, 30, 32 and 34, a ZN5064 is utilized for silicon controlled rectifier 36, a 30 volt ½ watt zener diode is utilized for diode 40, a 4000 series diode is utilized for diode 42, and a 27 ohms resistor is used for resistor 46. A 6 volt 33 MFD is utilized for capacitor 54 and a 100 kΩ utilized for resistor 56. The resistor 66, which can have a resistance of 10 kΩ, is part of the capacitor circuit. The resistor 66 regulates the rate of discharge of the capacitor.

I therefore claim:

1. A telephone privacy protector for connection to common exchange line and one of at least two telephone line operated devices sharing said line, the privacy protector comprising:
    a voice connecting circuit for connection between a respective telephone line operated device and the line;
    a silicon controlled rectifier connected to said circuit having an on and off state;
    means for turning said rectifier on when said respective telephone line operated device goes off hook, provided no other telephone line operated device connected to the line is off hook, thereby permitting said voice connecting circuit to operate; and
    means for providing a residual charge to said rectifier in order to reactivate same after said respective telephone line operated device is placed momentarily on hook and then returned to an off hook state while any other telephone line operated device connected to said line is off hook.

2. A telephone privacy protector according to claim 1 wherein said means to turn said rectifier on is a zener diode electrically connected to a gate of said silicon controlled rectifier.

3. A telephone privacy protector according to claim 2 wherein said means for providing a residual charge comprises a resistor and a timing circuit both electrically connected to said silicon controlled rectifier.

4. A telephone privacy protector according to claim 3 wherein said timing circuit comprises a capacitor electrically connected to a resistor.

5. A telephone privacy protector according to claim 2, wherein said voice connecting circuit comprises a rectifier bridge having two opposite pairs of rectifier junctions, one pair of said junctions adapted for connection between said exchange line an said respective telephone line operated device and the other pair of junctions being connected to said silicon controlled rectifier.

6. A telephone privacy protector for connection to a common exchange line and one of at least two telephone line operated devices sharing the line, the privacy protector comprising:
   a voice connecting circuit for connection between a respective telephone line operated device and the line;
   a control device connected to said circuit having an on and off state, said device in said on state permitting said voice connecting circuit to operate;
   means for turning said control device on when said one telephone line operated device goes off hook provided that no other telephone line operated device sharing the line is off hook; and
   means for providing a residual charge to said control device in order to reactivate same after said one telephone line operated device is placed momentarily on hook and then returned to an off hook state While any other telephone line operated device connected to said line is off hook.

7. A telephone privacy protector according to claim 6 wherein said means for turning said control device on is a zener diode electrically connected to said control device.

8. A telephone privacy protector device according to claim 6 wherein said means for providing a residual charge comprises a resistor and a timing circuit both electrically connected to said control device.

9. A telephone privacy protector device according to claim 8 Wherein said timing circuit comprises a capacitor electrically connected to a resistor.

10. A telephone privacy device according to claim 8 wherein said voice connecting circuit comprises a rectifier bridge having two opposite pairs of rectifier junctions, one pair of said junctions adapted for connection between said exchange line and said respective telephone line operated device and the other pair of junctions being connected to said control device.

11. A privacy protecting jack for connection to a common exchange line and one of at least two telephone line operated devices sharing the line, the jack comprising:
   a jack body having one end adapted for insertion in a connecting jack operatively connected to said exchange line and having a first jack receiving socket;
   a voice connecting circuit for connection between said one telephone line operated device and the line;
   a control device connected to said circuit having an on and off state, said device in said on state permitting said voice connecting circuit to operate,
   means for turning said control device on when said one telephone line operated device goes off hook provided that no other telephone line operated device sharing the line is off hook;
   means for providing a residual charge to said control device in order to reactivate same after said one telephone line operated device is placed momentarily on hook and then returned to an off hook state while any other telephone line operated device connected to said line is off hook,
   wherein said connecting circuit, control device, turning on means, and said residual charge providing means are mounted in said jack body.

12. A jack according to claim 11 wherein said jack body has a second jack receiving socket thereby allowing two telephone line operated devices to be connected to the same jack.

13. A jack according to claim 11 wherein said control device is a silicon controlled rectifier.

14. A jack according to claim 11 wherein said means for turning said control device on is a zener diode electrically connected to said control device.

15. A telephone privacy protector device according to claim 11 wherein said means for providing a residual charge comprises a resistor and a timing circuit both electrically connected to said control device.

16. A telephone privacy protector device according to claim 15 wherein said timing circuit comprises a capacitor electrically connected to resistor.

* * * * *